United States Patent [19]
Witters et al.

[11] Patent Number: 5,541,913
[45] Date of Patent: Jul. 30, 1996

[54] POLICING DEVICE

[75] Inventors: Johan H. Witters, Antwerp, Belgium; Johannes A. M. van Tetering, Zevenbergen, Netherlands; Guido H. M. Petit, Antwerp, Belgium

[73] Assignee: Alcatel N.V., Rijswijk, Netherlands

[21] Appl. No.: 382,654

[22] Filed: Feb. 2, 1995

[30] Foreign Application Priority Data

Feb. 7, 1994 [EP] European Pat. Off. .............. 94200231

[51] Int. Cl.⁶ .................................................... H04J 3/14
[52] U.S. Cl. ............................ 370/17; 370/60; 370/85.6; 370/94.1; 340/825.51
[58] Field of Search ................................ 370/17, 60, 13, 370/94.1, 14, 85.6, 111, 94.2, 60.1, 54, 58.1, 58.2, 58.3, 61; 340/825.06, 825.5, 825.51, 825.52

[56] References Cited

U.S. PATENT DOCUMENTS

| | | | |
|---|---|---|---|
| 5,253,247 | 10/1993 | Hirose et al. | 370/14 |
| 5,339,332 | 8/1994 | Kammerl | 375/224 |
| 5,361,253 | 11/1994 | Feijen et al. | 370/17 |
| 5,394,408 | 2/1995 | Nishihara et al. | 371/57.2 |
| 5,418,777 | 5/1995 | Worster | 370/17 |
| 5,432,713 | 7/1995 | Takeo et al. | 370/94.1 |
| 5,469,543 | 11/1995 | Nishihara et al. | 370/94.1 |
| 5,497,375 | 3/1996 | Hluchyj et al. | 370/94.1 |

FOREIGN PATENT DOCUMENTS 9311622 6/1993 WIPO .

OTHER PUBLICATIONS

"The Spacer-Controller: An Efficient UPC/NPC for ATM Networks", P. Boyer et al, *XIV International Switching Symposium*, Yokohama, Oct. 25–30, 1992, pp. 316–320.

"ATM Technology for Corporate Networks", P. Newman, *IEEE Communications Magazine* vol. 30, No. 4, Apr. 1992, pp. 90–101.

"The Spacing Policer, an Algorithm for Efficient Peak Bit Rate Control in ATM Networks", E. Wallmeier et al, *XIV Int'l Switching Symposium*, Yokohama, Oct. 25–30, 1992, pp. 22–26.

*Primary Examiner*—Alpus H. Hsu
*Assistant Examiner*—Ricky Q. Ngo
*Attorney, Agent, or Firm*—Ware, Fressola, Van Der Sluys & Adolphson

[57] ABSTRACT

A policing device is proposed in which a plurality of parallel police processors (PP1, PP2) are included each of which implements a Modified Virtual Scheduling Algorithm and is so able to derive for a cell for which it is activated by an enabling circuit (EC) a conformance signals (CS1, CS2). An arbitration module (AM) generates from the latter signals, a plurality of which may be provided per cell of the input ATM stream (IN), a discard signal (DS) indicating wether or not such a cell may be inserted into an output stream (OUT) by a discard circuit (DC) as well as feedback signals (FS1, FS2) which indicate to a corresponding processor whether or not to carry out an already prepared update of a predicted arrival time used in the above mentioned algorithm. The architecture of the present policing device is very generic in that it allows implementation of any policing method by straightforwardly adapting the arbitration module and the enabling circuit.

11 Claims, 1 Drawing Sheet

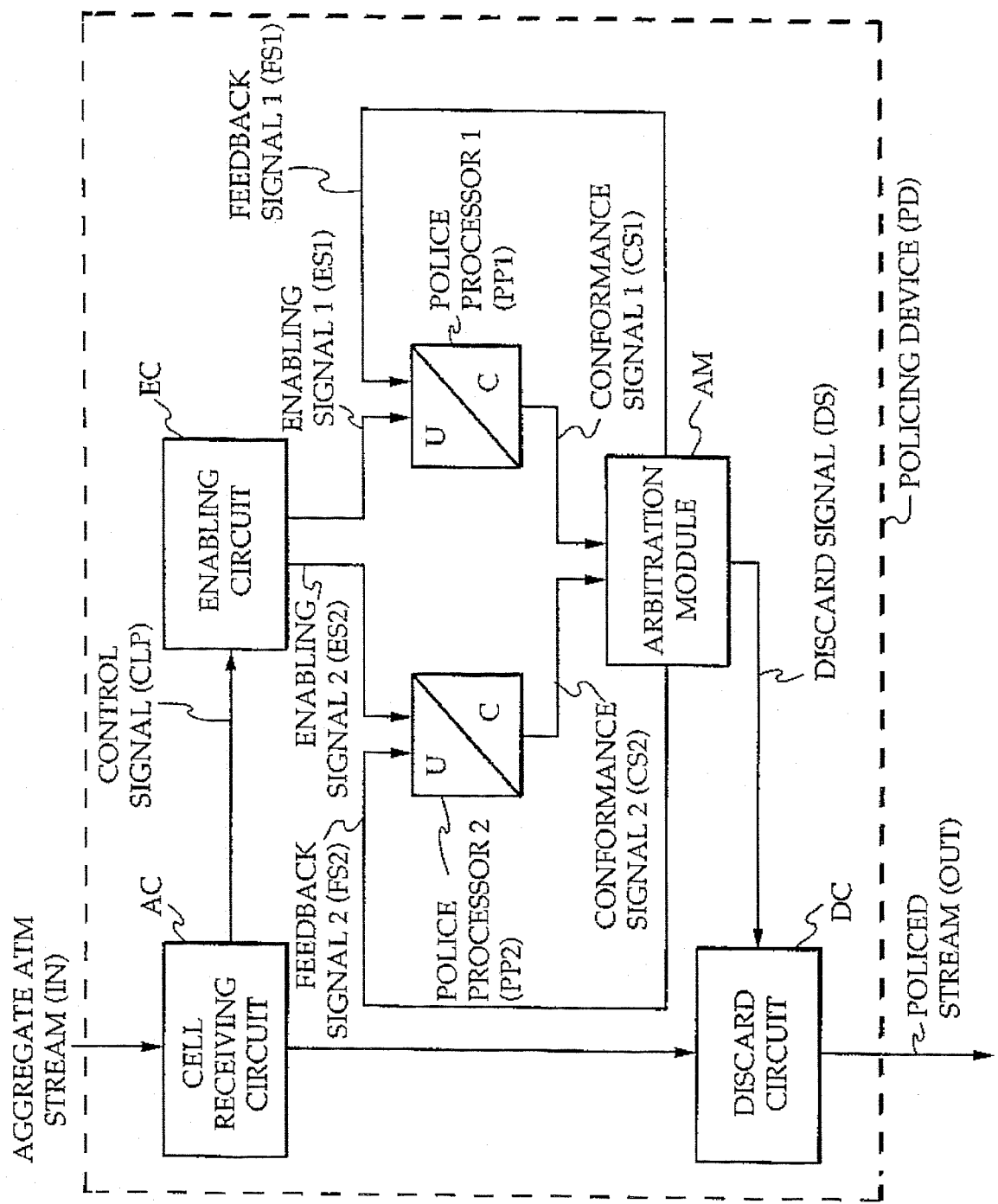

5,541,913

1
POLICING DEVICE

TECHNICAL FIELD

The present invention relates to telecommunications and, more particularly, a policing device including processing means applying respective ones of a plurality of police algorithm instances to respective ones of a plurality of cell streams and each of said instances having a conformance check part deriving a conformance signal indicating whether or not a cell handled thereby is satisfatory or not and an update part calculating an updated value of a parameter used by said instance.

BACKGROUND OF THE INVENTION

Such a policing device is already well known in the art, for instance from the article "The Spacer-Controller: an efficient UPC/NPC for ATM networks", by P. Boyer et al., ISS 1992, October 1992, Vol. 2, paper A9.3, pp. 316–320. Therein, the policing device polices an Asynchronous Transfer Mode or ATM cell stream in which first and second cells respectively of higher and lower priority are contained. For such an ATM stream, whose cells include a Cell Loss Priority or CLP bit that is 0 for the high priority first cells and 1 for the low priority second cells, the ITU-TS recommendation 1.371 prescribes that the substream of high priority first cells is to be policed separately, whereas the aggregate ATM stream of both first and second cells is also to be policed as a whole.

As can be appreciated from the referenced article, and particularly from FIG. 3 thereof, the above is achieved by a processing means in which two series connected processors each apply a specific police algorithm instance to a specific cell stream. The first processor thus operates according to an instance of a so called Virtual Scheduling Algorithm or VSA on a cell stream that consists of the high priority first cells, whereas the second processor operates according to a similar VSA instance on a cell stream which includes both unpoliced low priority second cells and policed high priority first cells. The virtual scheduling algorithm used is well known in the art and can be thought of as being split up into both a conformance check part indicating whether or not a cell is to be discarded according to a VSA instance and into an update part in which a basic parameter used by the VSA, i.e. the predicted arrival time, is updated as a function of the arrival time of a non-discarded cell.

An important drawback of this known device is that its sequential architecture is dedicated to one particular policing method, i.e. as described in the previous paragraph. This is a serious disadvantage since at the present stage of the standardization process it is not at all clear that this policing method will become the standard. Indeed, on the one hand a number of distinct policing methods requiring another architecture may be interpreted as satisfying the mentioned CCITT recommendation resulting in confusion about the latter recommendation which is not at all solved yet while on the other hand, it is not even clear that this recommendation will finally be adopted as the standard at all.

DISCLOSURE OF INVENTION

It may be thus appreciated, and it is indeed one of the merits of the invention to have done so, that a policing device easily adaptable to a large number of distinct methods for policing the above ATM stream is to be preferred. Indeed, in this case implementation of the policing device can begin already at the present while not running the risk that this implementation effort is wasted in view of subsequent changes to the mentioned CCITT recommendation.

An object of the present invention is therefore to provide a policing device of the above known type but with a more generic architecture easily adaptable to a wide variety of distinct policing methods.

This object is achieved by virtue of the fact that said processing means is able to produce for each said cell a plurality of said conformance signals in parallel and to supply them to an arbitration module also included in said device and which derives from said conformance signals a discard signal indicating whether or not said cell is to be discarded from an output cell stream as well as a plurality of feedback signals indicating whether or not the value of said parameter needs to be replaced by said updated value in respective ones of said instances.

The invention is based on the insight that if there is a maximum number of distinct instances having to police a same cell, e.g., two for the mentioned high priority cells, all conceivable policing methods may be realized by providing an architecture of the above novel type in which the processing means may produce in parallel exactly that maximum number of conformance signals of those distinct instances. In so doing it is indeed possible for the policing device to be adapted to each such conceivable method by adapting the arbitration module to suitably combine all relevant conformance signals. Examples of policing methods that may be so implemented are given below together with the adaptations, e.g. achieved by reprogramming the arbitration module, needed to obtain them.

The invention is furthermore based on the insight that with an architecture of the policing device as discussed above, feedback signals to the instances are required for them to know whether or not they have to go through with their prepared update. When for example an arbitration module decides to discard a cell despite the fact that a conformance signal is positive, it is clear that care needs to be taken via the feedback signals not to carry out the prepared update in the corresponding instance. Further examples of the necessity of these feedback signals are given later on with respect to specific policing methods.

It is to be noted that through the mechanism of first providing a prepared update and only effecting this prepared update dependent upon the final decision taken by the arbitration module, the police algorithm can be kept simple. Indeed, commonly used police algorithms such as the VSA already include an update part so that in the above way they only need to be adapted to ensure that this update part applies a calculated update only when a feedback signal instructs to do so.

In this respect attention is drawn to our pending and not yet published European patent application no 92203388.1 entitled "Policing device and policing method using same" from which U.S. patent application Ser. No. 08/147,888 claims priority now abandoned. This application already discloses the use of a plurality of parallel instances yielding intermediate discard signals that are combined by discard logic to a final discard signal but fails to disclose that the instances first prepare updated values which are applied or not dependent on the resulting feedback signals. Moreover, the above mentioned application is not concerned with the problem of providing a generic device architecture and hence specifically focusses on a single way of combining the results of the various instances namely via a discard logic in the form of an OR-gate.

A characteristic feature of the present invention is that it further includes enabling means enabling for a said cell those instances which handle cell streams from which said cell forms a part and that said arbitration module ignores conformance signals of instances which are not so enabled for said cell.

It is clear that by the provision of such enabling means the arbitration module can be kept simpler since it only has to take into account those conformance signals which are really applicable for the cell concurrent therewith. It is indeed clear that the invention does not require that for all cells parallel conformance signals have to be provided, it does not even require, as will be seen hereinbelow, that such parallel signals are provided for any of the cells that are handled by it. Indeed, the generic nature of the device derives from the provision of the possibility that for some cells parallel conformance signals are provided and hence not from the actual provision of such parallel signals which is only dependent upon the particular policing method performed by the policing device.

A very important feature of the present invention is that said processing means applies a first one of said instances to first cells and a second one of said instances both to first and second cells, both said first and second cells forming part of a same aggregate cell stream and that said enabling means enables said second instance for said second cells and both said first and second instances for said first cells and that said arbitration module generates said discard signal to discard from said output cell stream second cells which do not satisfy said second instance and also generates said feedback signal so as to update said second instance for second cells that satisfy said second instance.

In this way the policing device may handle an ATM cell stream as described above in accordance with the above mentioned ITU-TS recommendation. As may be appreciated from the description of the following three embodiments of the present invention this may be done in a number of distinct ways.

A first such embodiment is characterized in that said arbitration module generates said discard signal to discard from said output cell stream first cells that do not satisfy one of said instances and also generates said feedback signals to update both instances for first cells satisfying both said instances.

As may be verified the first embodiment corresponds to the policing method as carried out in the known device.

A second such embodiment is characterized in that said arbitration module generates said discard signal to allow first cells to be inserted in said output cell stream whenever they satisfy said first instance and also generates said feedback signals to update both said instances for first cells satisfying said first instance.

This second embodiment corresponds to a novel class of policing methods as disclosed in our co-pending European patent application 94200233.8 of even date entitled "Policing method" from which U.S. patent application Ser. No. 08/382,655, U.S. Pat. No. 5,511,066 (Atty docket No. 902-356) claims priority. As can be appreciated from the above these novel methods require a more complex control by the arbitration module in that for example the feedback signal to the second instance also needs to indicate an update thereof when a cell was found to be unsatisfactory by this instance. It is clear that by its structure the present device is best suited for providing this more complex control such that these novel methods are preferably implemented by this policing device.

A third embodiment of the present invention allows for the implementation of a tagging option for the first or high priority cells and is as such applicable as an extension of either of the above mentioned embodiments. This embodiment consists in that said arbitration module further generates said discard signal to convert first cells that do not satisfy said first but do satisfy said second instance to second cells and to insert them in said output cell stream, and that said second instance is updated for said first cells whenever they satisfy said second instance only.

From the previous three embodiments the genericity of the present policing device may be clearly appreciated in that it is inherently adapted to policing methods which would require correlation of more than one conformance signal, i.e. which would only be able to come to a final discard decision on the basis of more than one conformance signal. Indeed, in this case it suffices to map the required correlation into a suitable arbitration module for instance by writing a program reflective of the relation between the conformance signals on the one hand and the update feedback signals and the discard signal on the other hand. The straightforward manner in which such policing methods can be implemented as well as the fact that a number of them may be implemented alongside each other as different user selectable options is of great commercial value in the present field.

A further alternative feature of the invention is that said processing means applies a first one of said instances to first cells and a second one of said instances to second cells, both said first and second cells forming part of a same aggregate cell stream and that said enabling means enables said first instance for said first cells and said second instance for said second cells.

In this way the policing device may also be used to police the high priority first cells and the low priority second cells separately as is at present not allowed by the above CCITT recommendation but is still discussed as a viable option in the relevant technical committees. It may from the above feature be appreciated once again that the generic nature of the present device allows it to be completely future safe and that the present invention does not require the actual provision of parallel conformance signals.

Yet a further important feature of the invention is that said processing means also applies a third said instance to a third said cell stream comprising said second cells, said enabling means enabling said third instance only for said second cells, and in that said arbitration module generates said discard signal to insert first cells in said output cell stream when they satisfy both said first and said second instances and to insert second cells in said output cell stream when they satisfy both said first and third instances and also generates said feedback signals to update said first and second instances for so inserted first cells and said first and third instances for so inserted second cells.

Such a policing method may be required if not only peak cell rate but also sustainable cell rate policing is to be implemented since in this case the common standardization proposals suggest policing the peak cell rate of an aggregate cell stream while the sustainable cell rates of substreams consisting of first and second cells respectively is policed separately. It is clear that the present policing device can also implement such a policing method provided only that sufficient instances are provided thereby. It is to be noted that although with the above method only at most two parallel conformance signals are needed, it is required for the above generic architecture that there are still three instances as alternatives to the above method requiring three parallel signals are devisable, for instance in providing the tagging option.

Without going into further detail it is to be noted that a number of variations on and alternatives for the above sustainable cell rate policing method can be implemented by the present policing device as can, for that matter, a number of further alternatives for the above described embodiments.

Still another important feature of the invention is that all of said instances are taken from a same police algorithm.

That such may be the case for all above described embodiments of the present invention can be appreciated from the fact that both peak and sustainable cell rate policing may be carried out via the above mentioned and well known VSA, or by its equivalent continuous state leaky bucket algorithm. This is extremely advantageous as by providing only instances of a same algorithm maximum versatility of the policing device may be preserved.

Finally, it is to be noted that it is quite clear that police algorithm instances yielding parallel conformance signals may be provided by processing means either consisting of parallel police processors each carrying out one instance or by a processor that is fast enough to carry out all of the instances in the time available between the arrival of two consecutive cells or still by an intermediate solution with a number of parallel processors inferior to the number of instances.

These and other objects, features and advantages of the present invention will become more apparent in light of the detailed description of a best mode embodiment thereof, as illustrated in the accompanying drawing.

BRIEF DESCRIPTION OF THE DRAWING

The sole FIGURE shows a policing device, according to the invention.

BEST MODE FOR CARRYING OUT THE INVENTION

A policing device PD, according to the invention, as shown in this FIGURE is for instance used at the input of a switching network (not shown) with the purpose of verifying and performing corrections if the characteristics of a cell stream which have been negotiated with a user at call set-up are respected by this user.

The policing device PD shown is more particularly used for the policing with respect to the peak cell rate of aggregate ATM streams including a high priority first cells characterized by a Cell Loss Priority or CLP bit equal to 0 and low priority second cells characterized by a CLP bit equal to 1. Such an aggregate stream IN is supplied to the policing device PD at a like named terminal thereof and the policing device PD generates therefrom a policed stream OUT appearing at its like named output terminal. The policed stream thus generated is such that both the aggregate policed stream as the policed substream constituted by high priority cells behave within characteristics negotiated therefor at connection set-up.

The policing device PD more particularly includes a cell receiver circuit AC which for each cell received by it generates a control signal CLP identifying the cell priority i.e. whether it is a low or a high priority cell. It applies this control signal CLP which is identical to the CLP bit of the received cell to a control input of an enabling circuit EC and also forwards this cell to a discard circuit DC. This circuit DC discards the cell from or inserts it in the policed stream OUT dependent on a discard signal DS generated by control circuitry EC, PP1, PP2 and AM which is described hereinbelow. The latter control circuitry EC, PP1, PP2 and AM thus actually enforces the negotiated characteristics for the stream IN, whereas the actual physical derivation of the policed stream OUT is left to the discard circuit DC on the basis of the Go/NoGo type discard signal DS generated by this control circuitry.

The control circuitry EC, PP1, PP2 and AM includes the mentioned enabling circuit EC which as 9 function of the above control signal CLP activates a first police processor PP1 or a second police processor PP2 by means of a first or a second enabling signal ES1 and ES2 respectively. The latter signals are applied to enabling inputs of these processors PP1 and PP2 respectively.

These police processors PP1 and PP2 implement an instance of a same Modified Virtual Scheduling Algorithm or MVSA which is described hereinbelow and can be considered as comprising an update part U and a conformance check part C, as schematically shown in the drawing. By activating one of these processors PP1/PP2 and hence by carrying out at a specific point in time the respective instances of the MVSA, a first/second conformance signal, CS1/CS2, is produced indicating whether a cell processed by the corresponding police processor PP1/PP2 satisfies (or conforms to) the characteristic to be enforced thereby.

These conformance signals CS1 and CS2 are supplied to an arbitration module AM which in response thereto derives the above discard signal DS as well as a first and a second feedback signal FS1 and FS2 and applies the latter signals to control inputs of PP1 and PP2 respectively. As will become clear later on, these feedback signals FS1 and FS2 indicate to their corresponding processors whether or not they have to update a parameter used in the corresponding instance of the MVSA according to a value that is prepared together with the generation of the conformance signals.

Before describing some applications of the present policing device PD, the above mentioned MVSA an instance of which is carried out by PP1 and PP2 is described in relative detail. This MVSA comprises the following code:

```
IF (PAT<TIME)
     THEN
                TEMP_PAT:=TIME+NIAT
                CS:=1
     ELSE
                IF (PAT>TIME+γ)
                     THEN
                          TEMP_PAT:=PAT+NIAT
                          CS:=0
                     ELSE
                          TEMP_PAT:=PAT+NIAT
                          CS:=1
```

Wherein,

PAT is a predicted arrival time;

TIME is an arrival time of the handled cell;

TEMP_PAT is a prepared updated value of PAT;

γ is a so called Cell Delay Variation tolerance;

NIAT is a negotiated cell inter-arrival time;

CS is a conformance value indicating whether or not the handled cell is conforming according to the applied instance of the MVSA.

The above MVSA is similar to the well known virtual scheduling algorithm and its operation is therefore not discussed in detail here, except for the modifications that are introduced therein. A first such modification is that the predicted arrival time is not updated directly but that only an update is prepared for it in an intermediate variable TEMP_PAT. Whether or not this update is effectively applied then depends upon a feedback value FS in the following way:

| | | |
|---|---|---|
| IF (FS=1) THEN | PAT:=TEMP_PAT | |
| ELSE | PAT:= PAT | |

A second modification consists in the introduction of a new line allowing for the preparation of an update value even when an instance of the MVSA finds the handled cell to be unsatisfactory. As is clarified later on, this modification is only needed in applying specific policing methods but is introduced in all cases in order to keep the policing device PD generic, i.e. to allow each and any policing method to be applied by it. It is also implemented by each of the police processors PP1, PP2 in order to be able to use identical police processors in the policing device PD.

It is to be noted that the above MVSA may clearly be considered as being split up in a conformance check part C deriving the conformance signal CS and in an update part U preparing an updated value TEMP_PAT and carrying this update out or not. It is further to be noted that the processors PP1 and PP2 in carrying out an instance of the MVSA generate the resulting conformance values CS as conformance signals CS1 and CS2 respectively and that the feedback signals FS1 and FS2 issued by the arbitration module AM are used by the above instances of the MVSA as feedback value FS.

With the above description of the policing device PD in mind the application of a number of distinct policing methods is now discussed in detail by defining the operation of the enabling circuit EC and the arbitration module AM for these methods.

For a first class of policing methods the enabling circuit EC activates both processors PP1 and PP2 for the high priority first cells and the second processor PP2 only for low priority second cells in accordance with the following table wherein the value of the control signal CLP as already mentioned above denotes the priority of the actually handled cell:

| CLP | ES1 | ES2 |
|---|---|---|
| 0 | 1 | 1 |
| 1 | 0 | 1 |

From this table it is clear that high priority cells are handled both by PP1 and PP2, while low priority cells are handled by PP2 solely. It may be verified that this is in line with the general meaning of the present version of the ITU-TS recommendation I.371 which prescribes that the ATM stream IN including both high and low priority cells should be policed as a whole while the substream formed by the high priority cells should also be policed separately.

Throughout the following a plurality of policing methods all operating based on an enabling circuit EC of the above type will be discussed by outlining the operation of the arbitration module AM therefor. It is to be noted that from the foregoing remark it may be appreciated that each of these following methods belongs to the same class satisfying the requirements set forth in the mentioned recommendation.

A first such method is carried out by realizing the arbitration module AM in such a way that it performs the logical operations summarized in the following table. In this table CLP is included for clarity's sake; a value 1 for the conformance signals CS1 and CS2 indicates that the cell actually handled satisfies the corresponding instance; a value 1 for the discard signal DS indicates that the cell may be passed by DC; a value 1 for the feedback signals FS1 and FS2 indicates that a prepared update has to be carried out; and dis. indicates that the police processor corresponding to one of the signals CS1, CS2, FS1 and FS2 is disabled by EC.

| CLP | CS1 | CS2 | DS | FS1 | FS2 |
|---|---|---|---|---|---|
| 0 | 0 | 0 | 0 | 0 | 0 |
| 0 | 0 | 1 | 0 | 0 | 0 |
| 1 | 0 | 1 | 1 | 1 | 1 |
| 0 | 1 | 1 | 1 | 1 | 1 |
| 1 | dis. | 0 | 0 | dis. | 0 |
| 1 | dis. | 1 | 1 | dis. | 1 |

From the above table it may be verified that the policing method implemented is the one described in the above referenced article, i.e. wherein high priority cells are only inserted in the policed stream OUT when they conform to both police algorithm instances, in which case also both instances need to be updated.

A second method which may be implemented with the same enabling circuit EC and which is also disclosed in the above referenced article is similar to the first one but also allows for the tagging of high priority cells that do not satisfy the instance applied by the first processor PP1. It may be easily verified that the latter method is obtained by the following table:

| CLP | CS1 | CS2 | DS | FS1 | FS2 |
|---|---|---|---|---|---|
| 0 | 0 | 0 | 0 | 0 | 0 |
| 0 | 0 | 1 | 1 | 0 | 1 |
| 0 | 1 | 0 | 0 | 0 | 0 |
| 0 | 1 | 1 | 1 | 1 | 1 |
| 1 | dis. | 0 | 0 | dis. | 0 |
| 1 | dis. | 1 | 1 | dis. | 1 |

In the above table the tagging option is reflected in the adaptation of the second row such that high priority cells which cannot be accepted within the high priority substream but could be accepted as low priority cells are passed and that the instance carried out by PP2 is updated. It is to be noted that this presupposes that the discard signal DS and the discard circuit DC are so adapted that they may cooperate to change the CLP bit for such cells from 0 to 1 prior to the insertion of such a cell into the policed stream OUT.

A third method which may be implemented using the above defined enabling circuit EC is disclosed in Applicant's above mentioned co-pending U.S. application Ser. No. 08/382,655, U.S. Pat. No. 5,511,066 (Atty Docket No. 902-356) of even date and requires the arbitration module AM to operate as defined by the following table:

| CLP | CS1 | CS2 | DS | FS1 | FS2 |
|---|---|---|---|---|---|
| 0 | 0 | 0 | 0 | 0 | 0 |
| 0 | 0 | 1 | 0 | 0 | 0 |
| 0 | 1 | 0 | 1 | 1 | 1 |
| 0 | 1 | 1 | 1 | 1 | 1 |
| 1 | dis. | 0 | 0 | dis. | 0 |
| 1 | dis. | 1 | 1 | dis. | 1 |

As described in the last mentioned application and as may be verified from the third row of the above table, in this method a high priority cell satisfying the instance applied by the first processor PP1 handling the separate high priority substream, is always passed regardless of the result of the operation performed by the second processor PP2. However, for such a high priority cell both of the instances are updated, thus requiring the above mentioned extra line in the MVSA since an update for the instance implemented by PP2 has to be carried out also when PP2 finds this cell to be unsatisfactory.

A fourth method is similar to the above and also disclosed in Applicant's last mentioned application and consists in providing the tagging option also for a method as described hereinabove. It may be easily verified that such a method may be implemented by an arbitration module operating according to the following table:

| CLP | CS1 | CS2 | DS | FS1 | FS2 |
|-----|-----|-----|-----|-----|-----|
| 0 | 0 | 0 | 0 | 0 | 0 |
| 0 | 0 | 1 | 1 | 0 | 1 |
| 0 | 1 | 0 | 1 | 1 | 1 |
| 0 | 1 | 1 | 1 | 1 | 1 |
| 1 | dis. | 0 | 0 | dis. | 0 |
| 1 | dis. | 1 | 1 | dis. | 1 |

Again and as mentioned with respect to the above second policing method the tagging option is provided through adaptation of the second row of the table. As for the second policing method care has to be taken that via DS and DC the CLP bit of a high priority cell to be tagged can be converted from 0 to 1.

The above list of policing methods which may be performed by the enabling circuit EC as detailed above is by no means exhaustive and a skilled person may without further difficulty implement any other such method by applying the methodology set forth hereinabove.

A further policing method which requires adaptation of the enabling circuit EC consists in separately policing the substreams consiting of high and low priority cells. The latter method is in conflict with the current version of the above mentioned ITU-TS recommendation but is nevertheless still considered as a viable future solution.

For this policing method it can be easily seen that an enabling circuit EC and an arbitration module AM operating according to the following two tables are required.

| CLP | ES1 | ES2 |
|-----|-----|-----|
| 0 | 1 | 1 |
| 1 | 0 | 1 |

| CLP | CS1 | CS2 | DS | FS1 | FS2 |
|-----|-----|-----|-----|-----|-----|
| 0 | 0 | dis. | 0 | 0 | dis. |
| 0 | 1 | dis. | 1 | 1 | dis. |
| 1 | dis. | 0 | 0 | dis. | 0 |
| 1 | dis. | 1 | 1 | dis. | 1 |

It is important to note that all the above methods may be implemented on a same physical policing device PD by using for the enabling circuit EC and arbitration module AM general purpose logical units suitably programmed to carry out the operations identified in one of the above tables. It is particularly advantageous to provide a plurality of such programmes and to allow the user of the policing device, i.e. for instance the network operator, to select the one actually to be carried out by PD.

A final class of policing methods which are here described concern the policing not only according to the peak cell rate, as implicitly understood throughout the above, but also according to the sustainable cell rate. For the latter, it is well known that the virtual scheduling algorithm and hence also the MVSA may be used provided that with respect to a same ATM stream IN other parameter values are chosen for the above mentioned parameters NIAT and $\gamma$.

Currently it is proposed for such sustainable cell rate policing of an ATM stream that three distinct policing actions need to be performed, namely peak cell rate policing for the aggregate ATM stream and sustainable cell rate policing proper for both the separate low and high priority substreams. Obviously this can only be achieved by providing a policing device (not shown) of the above type but in which also a third police processor PP3 (not shown) is included and which also carries out an instance of the MVSA. Such a device is not shown in detail for brevity's sake since it consists simply in the provision of the mentioned third processor PP3 with all relating signals ES3, CS3, FS3 (not shown) provided in the same way as for PP1 and PP2.

For such a device to carry out the above currently proposed basic operating principle while also providing the tagging option, the enabling circuit EC is to be configured as shown in the following table:

| CLP | ES1 | ES2 | ES3 |
|-----|-----|-----|-----|
| 0 | 1 | 1 | 1 |
| 1 | 1 | 0 | 1 |

From this table it is clear that PP1 carries out the peak cell rate policing on the aggregate stream, whereas PP2 and PP3 carry out the sustainable cell rate policing on the high and the low priority substreams respectively. The third processor PP3 needs also to be activated for the high priority cells as follows from the fact that in order for tagging to be possible the latter processor needs also to be active in case such a high priority cell is to be tagged and therefore to be considered as a low priority cell. It is clear that if no tagging is to be used the enabling circuit EC may be reconfigured so as not to activate PP3 for high priority cells.

The actual policing method without tagging can then be performed by providing an arbitration module according to the following table:

| CLP | CS1 | CS2 | CS3 | DS | FS1 | FS2 | FS3 |
|-----|-----|-----|-----|-----|-----|-----|-----|
| 0 | 0 | x | x | 0 | 0 | 0 | 0 |
| 0 | 1 | 0 | 0 | 0 | 0 | 0 | 0 |
| 0 | 1 | 0 | 1 | 1 | 1 | 0 | 1 |
| 0 | 1 | 1 | x | 1 | 1 | 1 | 0 |
| 1 | 0 | dis. | x | 0 | 0 | dis. | 0 |
| 1 | 1 | dis. | 0 | 0 | 0 | dis. | 0 |
| 1 | 1 | dis. | 1 | 1 | 1 | dis. | 1 |

In the above table "x" denotes a don't care value introduced in order to clarify the table.

The operation defined by the above table may be summarized in that any cell is discarded in case it makes the aggregate stream violate a negotiated peak cell rate characteristic, whereas other cells that are satisfactory with regard to the sustainable cell rate of the substream to which they belong are passed with consequent updates of the corresponding sustainable cell rate processor PP2 or PP3 as well as of the aggregate stream processor PP1. Additionally, high priority cells unsatisfactory for or not conforming to PP2 but satisfactory for PP3 are passed as low priority cells with corresponding updates of PP1 and PP3. In the latter case DS and DC need to be so adapted that they are able to change the CLP bit of such a high priority cell. Also, if such tagging is to be suppressed, it suffices to reconfigure the third row of the above table such that DS, FS1, FS2 and FS3 are 0 therein.

It will be immediately apparent that a large number of variations may be conceived with regard to the latter sustainable cell rate policing. However, these are not described here in any detail since a person of ordinary skill in the art may draw up the relevant tables for EC and AM and hence may derive how the policing device is to be configured from the above methodology.

Finally it is to be noted that when the policing device includes three police processors, the above methods described with reference to the shown policing device PD can still be implemented. Indeed, in this case the enabling means has simply to be adapted in such a way that one of the three processors is permanently disabled. It can thus be seen that such a policing device including three processors is able to carry out, preferably by user control, all of the policing methods discussed hereinabove. To be noted also that EC may be left out of the policing device PD by supplying the CLP bit directly to AM, by always activating all of the instances and by letting AM then also perform the logical functions attributed hereinabove to EC.

While the principles of the invention have been described above in connection with specific apparatus, it is to be clearly understood that this description is made only by way of example and not as a limitation on the scope of the invention.

We claim:

1. Policing device (PD) including processing means (PP1, PP2) for applying respective ones of a plurality of police algorithm instances to respective ones of a plurality of cell streams and each of said police algorithm instances having a conformance check part (C) for deriving a conformance signal (CS1, CS2) indicating whether or not a cell handled by said conformance check part (C) is satisfactory or not and an update part (U) for calculating an updated value of a parameter used by said police algorithm instances wherein said processing means (PP1, PP2) is able to produce for each cell a plurality of said conformance signals (CS1, CS2) in parallel and to supply them to an arbitration module (AM) also included in said device (PD) and which derives from said conformance signals a discard signal (DS) indicating whether or not said cell is to be discarded from an output cell stream (OUT) depending on said discard signal being active or not, respectively, as well as a plurality of feedback signals (FS1, FS2) provided to respective ones of said police algorithm instances and indicating whether or not the value of said parameter needs to be replaced by said updated value in said respective ones of said police algorithm instances, said update part depending on said feedback signals being active or not respectively.

2. Policing device (PD) according to claim 1, wherein it further includes enabling means (EC) enabling for said cell those instances which handle cell streams from which said cell forms a part and wherein said arbitration module (AM) ignores conformance signals (CS1, CS2) of police algorithm instances which are not so enabled for said cell.

3. Policing device (PD) according to claim 2, wherein said processing means (PP1, PP2) applies a first one of said instances (PP1) to first cells and a second one of said instances (PP2) both to first and second cells, both said first and second cells forming part of a same aggregate cell stream (IN) and wherein said enabling means (EC) enables said second instance (PP2) for said second cells and both said first and second instances (PP1, PP2) for said first cells.

4. Policing device (PD) according to claim 3, wherein said arbitration module (AM) generates said discard signal (DS) to discard from said output cell stream (OUT) second cells which do not satisfy said second instance (PP2) and also generates said feedback signal (FS2) so as to update said second instance for second cells that satisfy said second instance.

5. Policing device (PD) according to claim 4, wherein said arbitration module (AM) generates said discard signal (DS) to discard from said output cell stream (OUT) first cells that do not satisfy one of said instances (PP1, PP2) and also generates said feedback signals (FS1, FS2) to update both instances for first cells satisfying both said instances.

6. Policing device (PD) according to claim 4, wherein said arbitration module (AM) generates said discard signal (DS) to allow first cells to be inserted in said output cell stream (OUT) whenever they satisfy said first instance (PP1) and also generates said feedback signals (FS1, FS2) to update both said instances (PP1, PP2) for first cells satisfying said first instance (PP1).

7. Policing device (PD) according to claim 5, wherein said arbitration module (AM) further generates said discard signal (DS) to convert first cells that do not satisfy said first (PP1) but do satisfy said second (PP2) instance to second cells and to insert them in said output cell stream (OUT), and wherein said second instance (PP2) is updated for said first cells whenever they satisfy said second instance only.

8. Policing device (PD) according to claim 2, wherein said processing means applies a first one of said instances (PP1) to first cells and a second one of said instances (PP2) to second cells, both said first and second cells forming part of a same aggregate cell stream (IN) and wherein said enabling means enables said first instance (PP1) for said first cells and said second instance (PP2) for said second cells.

9. Policing device according to claim 3, wherein said processing means also applies a third said instance to a third said cell stream comprising said second cells, said enabling means enabling said third instance only for said second cells, and wherein said arbitration module generates said discard signal to insert first cells in said output cell stream when they satisfy both said first and said second instances and to insert second cells in said output cell stream when they satisfy both said first and third instances and also generates said feedback signals to update said first and second instances for so inserted first cells and said first and third instances for so inserted second cells.

10. Policing device (PD) according to claim 6, wherein said arbitration module (AM) further generates said discard signal (DS) to convert first cells that do not satisfy said first (PP1) but do satisfy said second (PP2) instance to second cells and to insert them in said output cell stream (OUT), and wherein said second instance (PP2) is updated for said first cells whenever they satisfy said second instance only.

11. Policing device (PD) according to claim 1, wherein all of said instances are taken from a same police algorithm.

* * * * *

UNITED STATES PATENT AND TRADEMARK OFFICE
CERTIFICATE OF CORRECTION

PATENT NO. : 5,541,913
DATED : July 30, 1996
INVENTOR(S) : Witters et al

It is certified that error appears in the above-indentified patent and that said Letters Patent is hereby corrected as shown below:

At column 11, line 39 (claim 1, line 9), please change "instances" to --instance,--.

Signed and Sealed this

Nineteenth Day of November, 1996

Attest:

BRUCE LEHMAN

*Attesting Officer*     *Commissioner of Patents and Trademarks*